US012008979B1

(12) United States Patent
Heng

(10) Patent No.: US 12,008,979 B1
(45) Date of Patent: Jun. 11, 2024

(54) INTERNAL CLEANING DEVICE FOR A WIND INSTRUMENT

(71) Applicant: Reeds 'n Stuff GmbH, Sehmatal-Cranzahl (DE)

(72) Inventor: Udo Heng, Frankfurt am Main (DE)

(73) Assignee: Reeds 'n Stuff GmbH, Sehmatal-Cranzahl (DE)

( * ) Notice: Subject to any disclaimer, the term of this patent is extended or adjusted under 35 U.S.C. 154(b) by 0 days.

(21) Appl. No.: 18/417,536

(22) Filed: Jan. 19, 2024

(30) Foreign Application Priority Data

Jan. 19, 2023 (DE) .................... 10 2023 101 259.2

(51) Int. Cl.
*G10D 9/00* (2020.01)

(52) U.S. Cl.
CPC .................................. *G10D 9/00* (2013.01)

(58) Field of Classification Search
CPC .................................................. G10D 9/00
See application file for complete search history.

(56) References Cited

FOREIGN PATENT DOCUMENTS

| | | | | |
|---|---|---|---|---|
| AT | 518969 | A1 | | 2/2018 |
| DE | 3715490 | A1 | | 11/1988 |
| DE | 9214532 | U1 | | 1/1993 |
| KR | 20100006614 | U | * | 6/2010 |
| KR | 1020210017665 | A | | 2/2021 |

* cited by examiner

*Primary Examiner* — Robert W Horn
(74) *Attorney, Agent, or Firm* — Laurence A. Greenberg; Werner H. Stemer; Ralph E. Locher

(57) ABSTRACT

An internal cleaning device for a wind instrument which has a central channel and at least one tone hole which opens into the central channel. The internal cleaning device has a rod. The internal cleaning device has a rod with a rod end region and a rod start region. For reliably cleaning the tone holes of the corresponding wind instrument, a central channel sealing device is formed at the end region and a central channel insert or attachment is formed at the rod start region. The central channel insert or attachment has at least one fluid passage opening and/or the rod is a tube open at the rod start region and closed at the rod end region. A peripheral wall of the tube is formed with at least one tube opening.

11 Claims, 1 Drawing Sheet

INTERNAL CLEANING DEVICE FOR A WIND INSTRUMENT

CROSS-REFERENCE TO RELATED APPLICATION

This application claims the priority, under 35 U.S.C. § 119, of German Patent Application DE 10 2023 101 259.2, filed Jan. 19, 2023; the prior application is herewith incorporated by reference in its entirety.

FIELD AND BACKGROUND OF THE INVENTION

The present invention relates to an internal cleaning device for a wind instrument which has a central channel and at least one tone hole which opens into the central channel, wherein the internal cleaning device has a rod.

Since players use their mouths to blow into wind instruments, moisture enters the instrument along with the air and must be removed from the interior of the wind instrument in order not to damage the musical instrument by the permanent deposition of saliva or even gastric acid, so as to not impair the musical quality as a result of moisture-induced changes in the air flow behavior within the musical instrument.

The condensation water which collects in the tone holes of wind instruments, also referred to as wind channels, has an adhesive effect due to its surface tension. It accumulates in corners and collects on very small irregularities on the surface, forming droplets. As a result, very small irregularities in the wind channel, which do not amount to much when they are dry, are amplified, and the corresponding wind instrument sounds raspy.

Flute cleaning mops are typically used for the internal cleaning of flutes. These have a wire with a fleece cleaning attachment, which is pushed with the aid of the wire into an inner central channel of the flute in order to absorb moisture contained therein; for instance, condensation water which forms therein.

The tone holes of the flutes can thus hardly be cleaned, since the flute cleaning mop can only be moved back and forth axially in the central channel.

In a different internal cleaning device for wind instruments, a number of cloths are bonded together and pulled with a string through the interior of the wind instrument. Furthermore, as described in document DE 92 14 532 U, a cloth can be pulled through an eyelet by one of its corners, and then wound around a preferably profiled rod, which is then pushed through the wind instrument. The tone holes of the given wind instrument are also not cleaned in this way.

An apparatus for sterilizing a saxophone is known from document Korean published patent application KR 10 2021 0 017 665 A. The apparatus has a cover, a fan and a flexible tube having a plurality of holes, which is inserted into a bell of a saxophone. The opening of the bell is closed off with the cover. The fan blows air through the tube, which exits again through the openings in the tube in order to dry saliva residues in the saxophone. In addition, bacteria are killed by UV lamps arranged along the tube.

Austrian published patent application AT 518 969 A1 describes a wind instrument cleaning device having a flexible tube with a nozzle arranged thereon. The tube is inserted into a wind instrument, then a cleaning fluid flushes through it and exits at the nozzle. A cap placed on the tube prevents the cleaning fluid from spraying out of the wind instrument during flushing in a direction opposite the flushing direction.

German published patent application DE 3 715 490 A1 discloses a cleaning device for the interior of wind instruments, such as trumpets, having a flexible cord with a spherical or conical foam or sponge rubber attached at the end thereof. For the internal cleaning of the wind instrument, the foam or sponge rubber is moistened and pulled through the interior of the wind instrument. Sound holes of wind instruments cannot be cleaned with that internal cleaning device.

SUMMARY OF THE INVENTION

It is accordingly an object of the invention to provide a cleaning device for a wind instrument which overcomes the above-mentioned and other disadvantages of the heretofore-known devices and methods of this general type and which provides for an internal cleaning device for a wind instrument which allows tone holes of the corresponding wind instrument to also be reliably cleaned.

With the above and other objects in view there is provided, in accordance with the invention, an internal cleaning device for a wind instrument that is formed with a central channel and at least one tone hole which opens into the central channel. The internal cleaning device comprises:

- a rod having a rod start region and a rod end region;
- a central channel sealing device disposed at the rod end region of the rod;
- a central channel holder formed on or around the rod start region of the rod; and wherein:
  - the central channel holder is formed with at least one fluid passage opening;
  - and/or
  - the rod is a tube that is open at the rod start region and closed at the rod end region, and the tube has a peripheral wall formed with at least one tube opening.

In other words, the objects of the invention are solved by an internal cleaning device or cleaning tool for a wind instrument which has a central channel and at least one tone hole which opens into the central channel. The internal cleaning device has a rod, wherein a central channel sealing device is formed on the rod end region of the rod, and a central channel insert and/or attachment, i.e., a holder, is formed on, or around the rod start region of the rod. The central channel insert and/or attachment has at least one fluid passage opening and/or the rod is a tube open at the rod start region and closed at the rod end region, with at least one tube opening formed in the peripheral wall thereof.

In the present invention, the rod of the cleaning tool is inserted into the central channel of the wind instrument starting at its rod end region. The central channel of the wind instrument is closed on one end by the central channel sealing device located on the rod end region. A fluid channel which is delimited on one end by the central channel sealing device and which is connected with the tone holes in this region of the wind instrument is thus created between an inner wall of the central channel around the region of the rod located in the wind instrument. In the present invention, a fluid is understood to mean both air and moisture-containing air, and also liquids.

The tone holes can be blown out or suctioned with air or liquid via this fluid channel. This takes place via the central channel insert and/or attachment located on or around the rod start region or via the rod itself. In the first case, the central channel insert and/or attachment has at least one fluid passage opening via which it is in direct fluid connection with the fluid channel and thus also with the at least one tone hole. In the second case, the rod is hollow inside, i.e., a tube, is closed at its rod end region, and has at least one tube opening in its peripheral wall. Thus, in this second case, the fluid channel and thus also the at least one tone hole can be cleaned by blowing or suctioning through the rod.

If the at least one tone hole is closed by means of a tone hole plate, as is sometimes the case with an oboe, it must be opened for cleaning. If all of the tone holes leading into the fluid channel are open, as is the case, for example, in the case of the flute, all of the tone holes opening into the fluid channel must be closed with the exception of one during the cleaning of the given open tone hole.

In an advantageous embodiment of the internal cleaning device according to the invention, the central channel sealing device is a rubber or silicone collar. Due to the flexibility of the material of the rubber collar or silicone collar, it can easily be inserted into the central channel of the wind instrument; and it rests against the inner wall of the central channel and thus closes the central channel on one end. In this case, the rubber or silicone collar adapts to different central channel inner diameters of the respective wind instrument, which, for example, is a great advantage in the case of wind instruments such as the oboe, in which the central channel inner diameter widens conically inward.

In another likewise suitable embodiment of the internal cleaning device according to the invention, the central channel sealing device can also have an umbrella, and an opening and closing mechanism for the umbrella. The umbrella is preferably oriented in such a way that it projects with its umbrella tip toward the rod end region. However, the umbrella can also be aligned in the opposite direction—that is to say, with its umbrella tip in the direction of the rod start region. In any case, the umbrella must be able to be opened so that it is able to close the central channel. At a desired location in the central channel, the umbrella can be opened by the opening and closing mechanism to such an extent that it closes the central channel on one end. Conversely, after the internal cleaning of the wind instrument has taken place, the umbrella can be folded together again with the opening and closing mechanism for a simple removal of the rod from the wind instrument.

In yet another embodiment of the internal cleaning device according to the invention, the central channel sealing device can be a balloon. This balloon is inflatable and can be emptied by suction. The balloon can thus be inflated to the extent that it closes the central channel on one end. The balloon can be emptied by suction to allow pulling out the rod from the wind instrument.

The at least one tube opening is preferably at least one elongated slot. The elongated slot extends along a partial length of the rod and thus creates a fluid connection between the rod start region and the fluid channel surrounding the rod, and thus also with the at least one tone hole opening into the fluid channel, as a result of which both the fluid channel and the at least one tone hole can be blown out or suctioned out simply and effectively.

While it is generally possible in the present invention for the wind instrument to be blown out or suctioned out by means of the internal cleaning device by a mouth attached directly to the rod start region and/or the central channel insert and/or attachment, in an advantageous embodiment of the internal cleaning device according to the invention, a blowing or pumping device is arranged on a blowing or pumping opening of the central channel insert and/or attachment, and this carries out the blowing or suctioning.

By way of example, the blowing or pumping device is a balloon pump, a piston pump, or a bellows.

It has proven to be particularly advantageous if the central channel insert and/or attachment is a rotary part with a rod receptacle and an insertion sleeve overlapping the rod receptacle, wherein the at least one fluid passage opening is formed between the insertion sleeve and the rod receptacle. In this embodiment of the internal cleaning device according to the invention, the rod is received, for example clamped, screwed or glued, in the rod receptacle in its rod start region. In this embodiment of the invention, the insertion sleeve is inserted or pushed into the central channel.

An attachment bell can be formed around the insertion sleeve, spreading over an open end of the wind instrument where a mouthpiece of the wind instrument typically sits when the wind instrument is in use. The attachment bell is preferably connected to the insertion sleeve at a blowing or suction opening of the internal cleaning device. This provides an additional tightness at the blowing or suction opening.

If the rod is a tube, in a simple embodiment of the internal cleaning device according to the invention, the central channel insert and/or attachment can be an insert plug or an attachment cuff through which the tube is passed in its peripheral wall which has the at least one tube opening. If the central channel insert and/or attachment is an insert plug, it is pushed into the central channel. If the central channel insert and/or attachment is an attachment cuff, it spreads over an open end of the wind instrument on which a mouthpiece of the wind instrument is typically seated when the wind instrument is in use. The rod start region in this case is held in a central position by the insert plug or the attachment cuff, wherein the otherwise open end of the wind instrument is advantageously sealed, up to the open tube start, by means of the insert plug or the attachment cuff.

The rod is particularly stable if it is formed from carbon.

Other features which are considered as characteristic for the invention are set forth in the appended claims.

Although the invention is illustrated and described herein as embodied in an internal cleaning device for a wind instrument, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 2:
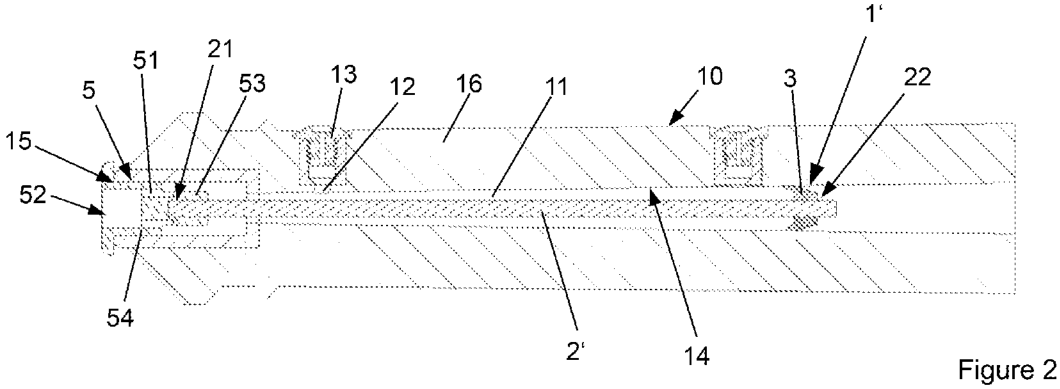
FIG. 2 schematically shows a further embodiment of the internal cleaning device according to the invention in a cutaway side view.

Referring now to the figures of the drawing in detail, there is shown a schematic sectional view of an exemplary embodiment of an internal cleaning device 1 according to the invention for a wind instrument 10. FIG. 2 shows a further embodiment of an internal cleaning device 1' according to the invention for a wind instrument 10, likewise in a side view of a longitudinal section.

In the embodiments shown, the wind instrument 10 is an oboe, of which only a portion is shown, without tone hole plates. However, the corresponding internal cleaning device 1, 1' can also be used for other wind instruments, for example for flutes or clarinets, or the like.

In its body 16, the wind instrument 10 has a hollow central channel 11. Multiple tone holes 12 each running through the body 16 open laterally into the central channel 11. The central channel 11 has an inner wall 14 through which the tone holes 12 pass.

In the embodiment shown, the tone holes 12 are each formed at the end of an octave valve 13. In other embodiments of the present invention, for instance for a flute, the tone holes 12 can also be designed without a connection to an octave valve 13. In the corresponding wind instrument 10, a tone hole plate (not shown in the figures) can be formed on the outside on the corresponding tone hole 12 or on the octave valve 13.

When it is played, the wind instrument 10 has a mouthpiece on its instrument start region 15, which mouthpiece is removed for the internal cleaning of the wind instrument 10 and is therefore not shown in the figures.

Each of the internal cleaning devices 1, 1' has a rod 2, 2'. The rod 2, 2' has a rod start region 21 and a rod end region 22 opposite the rod start region. By the rod end region 22, the rod 2, 2' is inserted through the instrument start region 15 into the central channel 11 of the wind instrument 10.

In the embodiments shown, the rod 2, 2' is made of carbon. It should be understood, however, that it can also be made of a different material, such as metal.

A fluid channel runs between the corresponding rod 2, 2' and the inner wall 14 of the central channel 11.

The rod 2 of the internal cleaning device 1 is a tube, i.e., it is hollow inside. The rod 2 has an elongated slot 23. The elongated slot 23 is a tube opening formed in a peripheral wall of the tube. Instead of the elongated slot 23 or in addition to the elongated slot 23, other tube openings, such as holes, can also be formed in the peripheral wall of the tube.

The corresponding tube opening creates a fluid connection between the tube interior and the central channel 11 of the wind instrument 10.

The rod 2 is open at its rod start region 21 and closed at its rod end region 22. Air which is blown into the rod 2 at the rod start region 21, and/or liquid which is sprayed into the rod 2 at the rod start region 21, thus exits only through the elongated slot 23 into the central channel 11, and passes through this through a tone hole 12 that is open during the internal cleaning to the outside. Conversely, air and/or liquid which is sucked in via the open rod start region 21 first runs over the open tone hole 12, then into the central channel 11, then via the elongated slot into the hollow interior of the rod 2 into the rod start region 21. The corresponding air flow carries entrained moisture so that it is blown out or is sucked out of the wind instrument 10, in particular also from the open tone hole 12.

Figure 1:
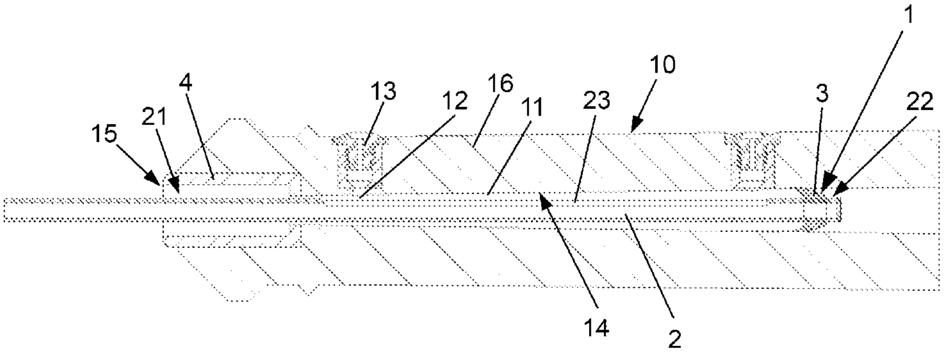
FIG. 1 is a schematic view of an embodiment of the internal cleaning device according to the invention in a cutaway side view.

In the internal cleaning device 1 of FIG. 1, the rod 2 is held through a central channel insert and/or attachment 4 which is designed as an insert plug. The device 4 may be referred to as a central channel holder 4 or guide. The insert plug can, for example, be a cork. The insert plug is inserted into the instrument start region 15 and is held fixed therein. The central channel insert and/or attachment 4, i.e., holder 4, holds the rod 2 centrally in the central channel 11.

In this case, the rod 2 projects out of the insert plug at its rod start region 21, and is thus accessible from the outside.

Instead of the insert plug, in other embodiments of the present invention, the central channel insert and/or attachment unit 4 can also be designed as an attachment cuff which is spread over the instrument start region 15 and through which the rod 2 is held centrally, and which holds the rod 2.

In the internal cleaning device 1' of FIG. 2, the rod 2' is a closed rod, i.e., not hollow inside. The rod 2' can, for example, consist of wires wound around one another.

The rod 2' is held at its rod start region 21 on a central channel insert and/or attachment 5. The device 5 may also be referred to as a central channel holder 5. In the embodiment shown, the central channel insert and/or attachment 5 is a rotary part. The central channel insert and/or attachment 5, i.e., the holder 5, has a centrally formed rod receptacle 53 in which the rod start region 21 of the rod 2' is accommodated. The rod receptacle 53 is overlapped by an insertion sleeve 54. At least one fluid passage opening 51 is formed between the insertion sleeve 54 and the rod receptacle 53.

In this embodiment, the rod start region 21 of the rod 2' is located in the central channel 11 when the internal cleaning device 1' is inserted into the wind instrument 10. The rod 2' is therefore not itself accessible from the outside, but only indirectly via the central channel insert and/or attachment 5.

The insertion sleeve 54 is fixedly inserted in the instrument start region 15. In other embodiments of the present invention, which are not shown, an attachment bell can be formed concentrically to the insertion sleeve about the instrument start region 15.

For internal cleaning of the wind instrument 10, a blowing or pumping device (not shown in FIG. 2) is placed onto the central channel insert and/or attachment 5. The blowing or pumping device may be, for example, a balloon pump, a piston pump, or a bellows.

Such a blowing or pumping device is unnecessary in the internal cleaning device 1 of FIG. 1. There, the mouth can be applied directly to the rod start region 21, and can be used to blow or suction through the rod 2.

Since multiple tone holes 12 are typically connected to the central channel 11, an effective cleaning of each open tone hole 12 can be achieved via an alternating opening and closing of the tone holes 12.

A central channel sealing device is formed in each case on the rod end region 22 of the corresponding rod 2, 2'. The central channel 11 is sealed with the central channel sealing device.

In the embodiments shown, the central channel sealing device is a rubber or silicone collar 3 which extends around the rod 2, 2'. The rubber or silicone collar 3 is always pushed against the inner wall 14 of the central channel 11, because it consists of flexible material. It accordingly seals a region of the central channel 11 upstream the rubber or silicone collar 3 from a region of the central channel 11 downstream the rubber or silicone collar 3.

In other, non-illustrated embodiments of the present invention, an umbrella can also be used as the central channel sealing device, which umbrella has an opening and closing mechanism for the screen. Furthermore, an inflatable balloon which can be emptied by suction can also be used as the central channel sealing device.

In principle, multiple central channel sealing device can also be arranged over the length of the rod 2, 2'.

The invention claimed is:

1. An internal cleaning device for a wind instrument that is formed with a central channel and at least one tone hole which opens into the central channel, the internal cleaning device comprising:

a rod having a rod start region and a rod end region;

a central channel sealing device disposed at said rod end region of said rod;

a central channel holder formed on or around said rod start region of said rod; and said central channel holder being formed with at least one fluid passage opening;

and/or said rod being a tube that is open at said rod start region and closed at said rod end region, and said tube having a peripheral wall formed with at least one tube opening.

2. The internal cleaning device according to claim 1, wherein said central channel sealing device is a rubber or silicone collar.

3. The internal cleaning device according to claim 1, wherein said central channel sealing device comprises an umbrella and an opening and closing mechanism for said umbrella.

4. The internal cleaning device according to claim 1, wherein said central channel sealing device is an inflatable balloon that is configured to be emptied by suction.

5. The internal cleaning device according to claim 1, wherein said at least one tube opening is an elongated slot.

6. The internal cleaning device according to claim 1, wherein a blowing or pumping device is arranged on a blowing or pumping opening formed in said central channel holder.

7. The internal cleaning device according to claim 6, wherein said blowing or pumping device is selected from the group consisting of a balloon pump, a piston pump, and a bellows.

8. The internal cleaning device according to claim 1, wherein said central channel holder is a rotary part with a rod receptacle and an insertion sleeve overlapping said rod receptacle, and wherein said at least one fluid passage opening is formed between said insertion sleeve and said rod receptacle.

9. The internal cleaning device according to claim 8, which comprises an attachment bell formed around said insertion sleeve.

10. The internal cleaning device according to claim 1, wherein said central channel holder is an insert plug or an attachment cuff, and said tube in which said at least one tube opening is formed passes through said insert plug or said attachment cuff.

11. The internal cleaning device according to claim 1, wherein said rod is formed from carbon.

* * * * *